United States Patent [19]

Matson

[11] 3,892,054

[45] July 1, 1975

[54] STRUCTURAL PANEL JOINT

[76] Inventor: Robert P. Matson, 1790 Old Tasso Rd., Tasso, Tenn.

[22] Filed: Nov. 2, 1973

[21] Appl. No.: 412,170

Related U.S. Application Data

[63] Continuation-in-part of Ser. No. 227,883, Feb. 22, 1972, abandoned.

[52] U.S. Cl. .................. 52/665; 52/584; 52/615; 52/758 A
[51] Int. Cl. .............................. E04c 2/42
[58] Field of Search .......... 52/753 R, 753 C, 753 D, 52/753 B, 754, 758 A, 760, 585, 586, 584, 664, 665, 666, 667, 615; 403/230

[56] References Cited
UNITED STATES PATENTS

| | | | |
|---|---|---|---|
| 170,470 | 11/1875 | Craig | 52/753 B |
| 1,083,697 | 1/1914 | Neptune | 52/753 B |
| 2,415,180 | 2/1947 | John | 403/230 |
| 2,931,468 | 4/1960 | Keller | 52/664 |

FOREIGN PATENTS OR APPLICATIONS

| | | | |
|---|---|---|---|
| 794,097 | 4/1958 | United Kingdom | 403/230 |

*Primary Examiner*—Henry C. Sutherland
*Assistant Examiner*—Robert Farber
*Attorney, Agent, or Firm*—B. J. Powell

[57] ABSTRACT

A structural panel including an open core frame covered by skin elements to form the panel. The frame is made up of I-beams which are connected together with an interlock to form joints. One of the I-beams in each joint has a tongue which fits between the flanges of the other I-beam and is notched to receive a retaining rib of the interlock. A lip on the flange retains the interlock in place.

6 Claims, 7 Drawing Figures

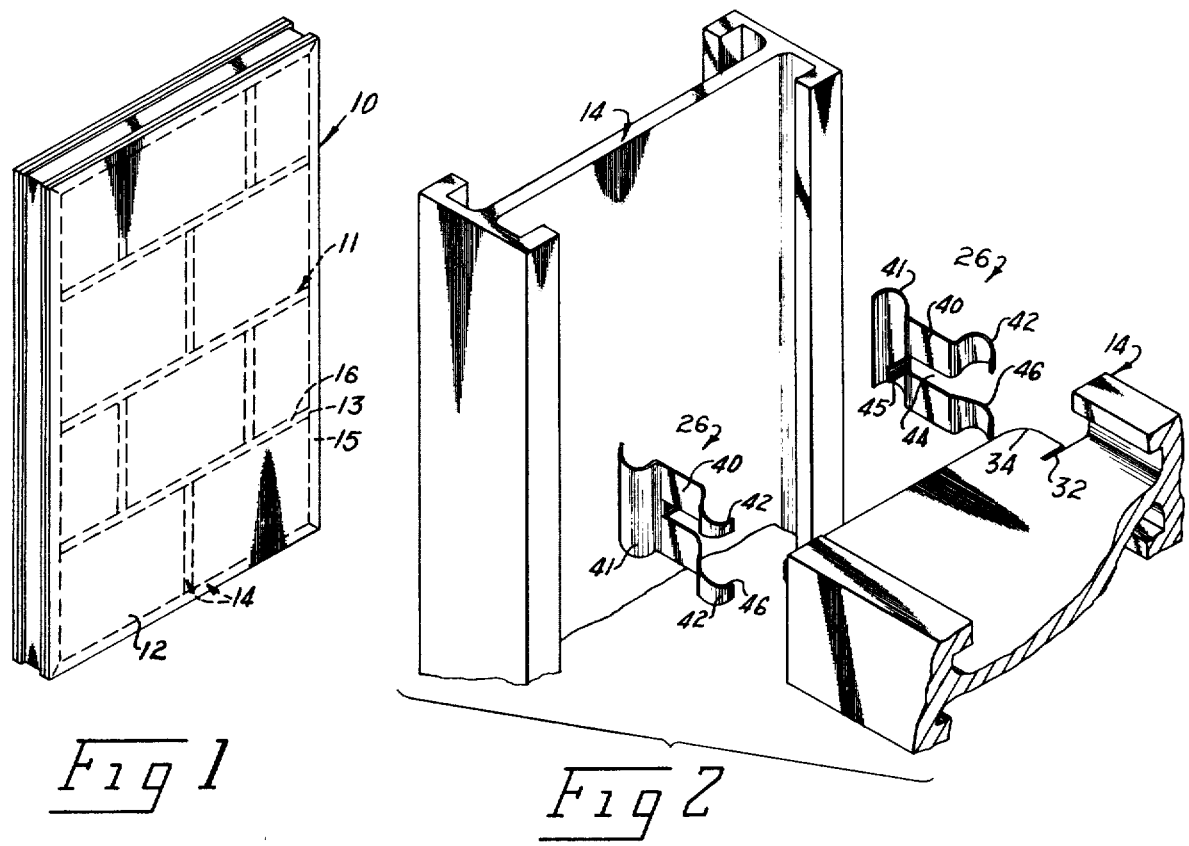
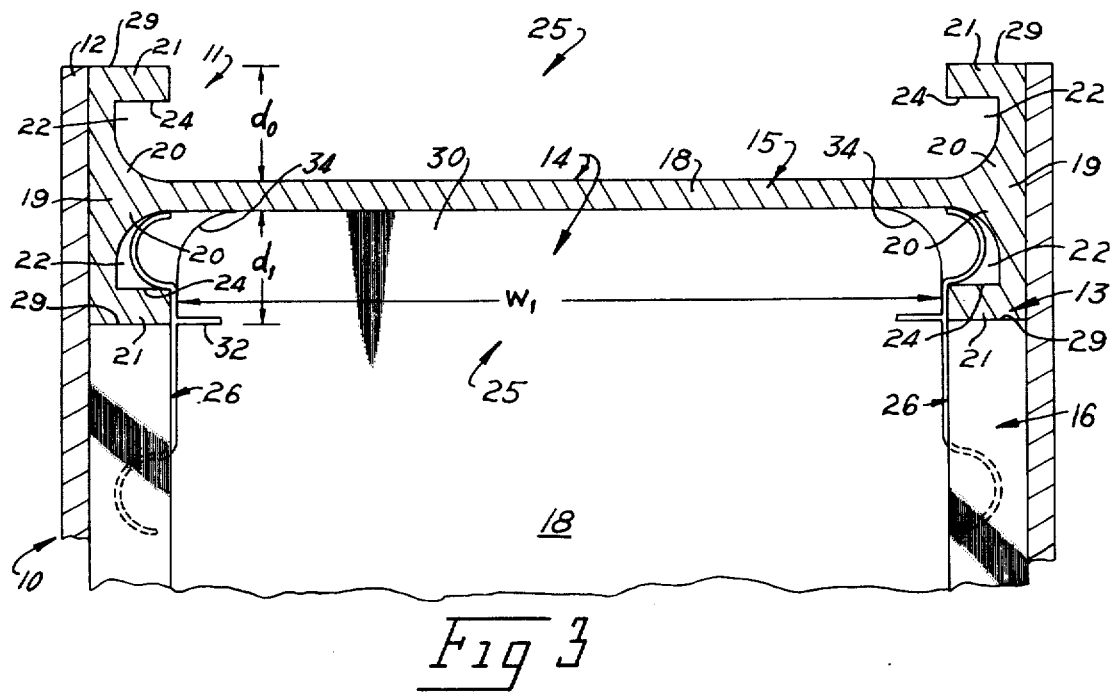

STRUCTURAL PANEL JOINT

CROSS-REFERENCE TO RELATED APPLICATIONS

This application is a continuation-in-part of my co-pending application Ser. No. 227,883, filed Feb. 22, 1972 for "Structural Panel," now Pat. No. 3,780,485.

BACKGROUND OF THE INVENTION

Various kinds of structural panels are available on the market today. Such panels generally have an open core framework covered by skin members on opposite sides thereof. These prior art panels have very simple joints connecting the members in the framework in an attempt to reduce the manufacturing cost of the panel. The construction of these joints, however, have required that they be manually assembled. This has caused the cost of construction to be maintained high and quality control hard to maintain.

SUMMARY OF THE INVENTION

These and other problems and disadvantages associated with the prior art are overcome by the invention disclosed herein by providing a structural panel having sufficient joint strength to carry a bearing load while at the same time allowing the joints to be machine assembled. Moreover, the joint construction is relatively simple so as to permit the panel to be economically manufactured. Because the beams forming the open grid framework of the panel can be placed in position and then locked in place without further movement of the beams relative to each other, the relative angles between beams of a particular joint can be varied to provide for panels having greater versatility as to overall shape.

The panel of the invention uses I-shaped beams for the interior open grid framework which is closed by outer sheets of material to form the panel. The open framework is provided by extending the web portions of certain of the I-beams and positioning the protruding web portion between flanges of another of the I-beams. A resilient interlocking member is used to lock the I-beams with respect to each other to form the joint so that the joints can be machine assembled. When the open framework is completed, the sheet material is attached to both sides of the framework to complete the panel.

These and other features and advantages of the invention will become more clearly understood upon consideration of the following specification and accompanying drawings wherein like characters of reference designate corresponding parts throughout the several views and in which:

BRIEF DESCRIPTION OF THE DRAWINGS

FIG. 1 is a perspective view of a structural panel embodying the invention;

FIG. 2 is an exploded perspective view of part of the panel of FIG. 1;

FIG. 3 is an enlarged cross-sectional view taken along line 3—3 in FIG. 1;

Figure 4:
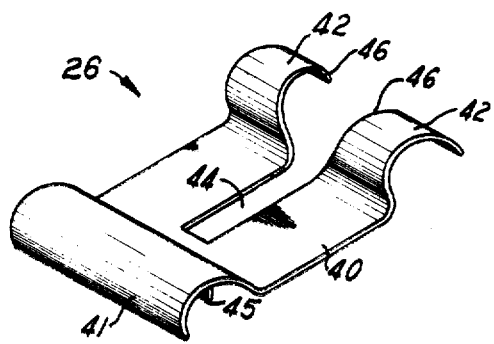
FIG. 4 is a perspective view of an interlock of the invention.
Figure 5:
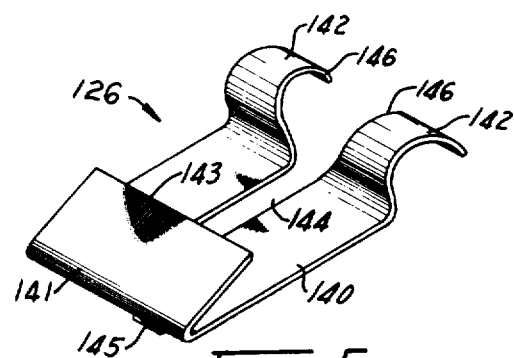
FIG. 5 is a perspective view of an alternate embodiment of the interlock.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to FIGS. 1–3, the structural panel 10 embodying the invention includes an open grid framework 11 covered on opposite sides by sheets of material 12. This produces a strong lightweight panel.

The framework 11 is formed of I-beams 14, some of which extend through the panel as stringers 15 and some of which extend between stringers 15 as connectors 16 to form joints 13. All of the I-beams 14 have the same cross-sectional shape with a central web 18, and a pair of flanges 19 on opposite edges of web 18 and extending outwardly therefrom generally perpendicular to web 18. The flanges 19 are joined to web 18 by a fillet 20. The outermost edges of each flange 19 is provided with an integral inwardly turned lip 21 to form a longitudinally extending recess 22 between the web facing surface 24 of lip 21 and the web 18 and an opening 25 between opposed lips 21 on the same side of web 18. The connectors 16 and stringers 15 are held together by interlocks 26.

The end of each connector 16 is formed to fit within the opening 25 between the lips 21 and to be engaged by the interlocks 26 to be held in place. This is done by removing the flanges 19 from the end of the connector 16 a prescribed distance $d_1$ equal to the depth $d_0$ of the opening 25 from the outer surface 29 of lip 21 to the surface of web 18 and notching the edges of web 18. This provides a tongue 30 on web 18 which protrudes the distance $d_1$ beyond the ends of flanges 19 on connector 16 and which has a width $w_1$ to allow passage of the tongue 30 into opening 25 and abut web 18. A notch 32 is provided in the opposite edges of the tongue 30 which receives the interlock 26 therein and the innermost corners of tongue 30 in opening 25 are rounded to provide a camming surface 34 as will become more apparent.

Figure 6:
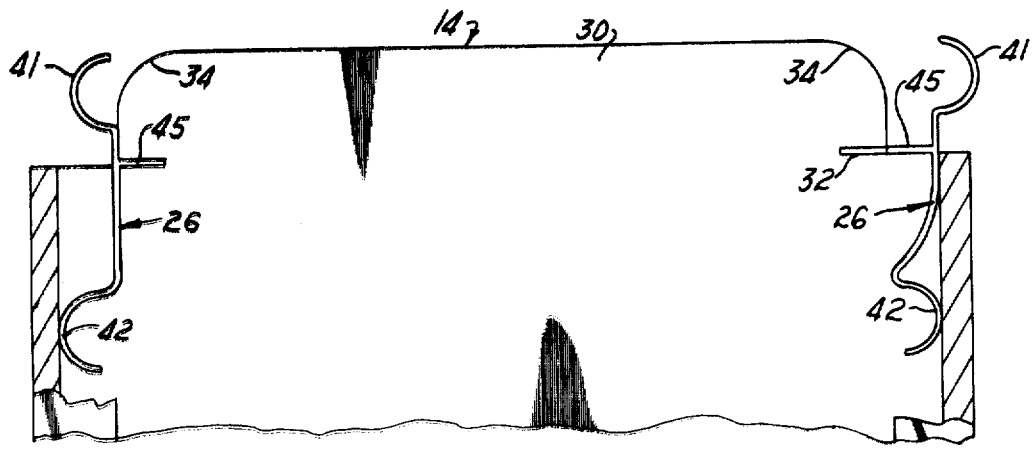
FIG. 6 is a view showing the interlock being attached.
Figure 7:
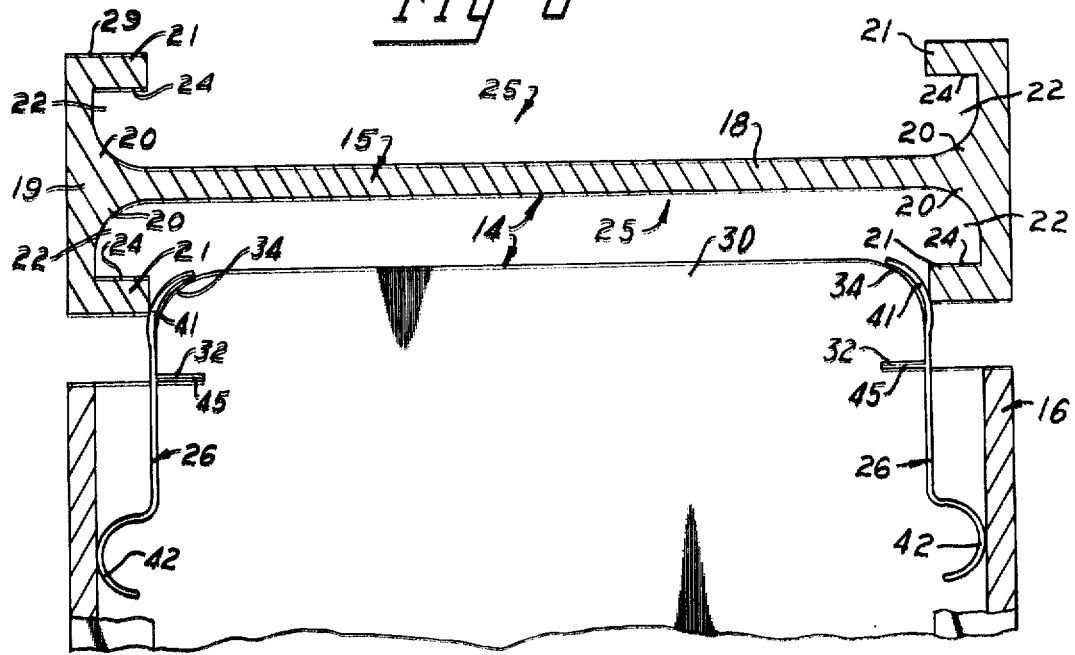
FIG. 7 is a view showing the joint being completed.

The interlock 26 is best seen in FIGS. 4 and 6–7 and includes a bifurcated main body 40 with an arcuate locking section 41 at its inner end and a pair of arcuate retaining sections 42 at its outer end on opposite sides of the slot 44. The sections 41 and 42 extend outwardly from the outside of body 40 and a locking tab 45 at the inner end of slot 44 projects inwardly from the inside of body 40 substantially normal to the plane of body 40. The entire interlock 26 is made out of a resilient material such as spring steel as will become more apparent. The width of slot 44 is substantially that of the thickness of web 18 while the width of body 40 is substantially equal to the distance between the inside opposed surfaces on the lips 21 on each flange 19. The edges of the retaining sections 42 are cut away at 46 at slot 44 to clear the fillets 20 as will become more apparent.

The interlock 26 is installed on the ends of connectors 16 on opposite sides of tongue 30 by inserting the sections 42 and bifurcated portions of body 40 into recesses 22 so that the central web 18 of connector 16 is received in slot 44. The interlock 26 is then flexed so that the tab 45 is aligned with notch 32 as illustrated on the right hand side of FIG. 6. The tab 45 is then inserted into the notch 32 and interlock 26 released. The resiliency of the retaining sections 42 and tab 45 hold the interlock 26 in place as illustrated on the left hand side of FIG. 6. In this position, the locking section 41 overlies the camming surface 34 on the end of tongue 30 and the joint 13 is ready to be completed.

To complete the joint 13, the tongue 30 of connector 16 with the interlocks 26 thereon is simply pushed straight into the opening 25 between the lips 21 of the stringer 15 as seen in FIG. 7. This causes the lips 21 on stringer 15 along with the camming surfaces 34 on the tongue 30 of connector 16 to partially flatten the locking sections 41 of interlocks 26 as seen in FIG. 7 to allow the sections 41 to pass between the lips 21 on stringer 15. As soon as the locking sections 41 pass into the recesses 22, their natural resiliency causes them to spring back to their natural position seen in FIG. 3. This causes the interlocks 26 to engage the surfaces of lips 21 facing web 18 of stringer 15 to lock the connector 16 onto stringer 15 and form joint 13.

An alternate embodiment of the interlock is illustrated in FIG. 6 and designated by the numeral 126. The interlock 126 is used in lieu of interlock 26 and includes a bifurcated main body 140 with an angle locking section 141 at its inner end and a pair of arcuate retaining sections 142 at its outer end on opposite sides of slot 144. The sections 141 and 142 extend outwardly from the outside of body 140 and a locking tab 145 at the inner end of slot 144 projects inwardly from the inside of body 140 substantially normal to the plane of body 140. The entire interlock 126 is made out of a resilient material such as spring steel as will become more apparent. The width of slot 144 is substantially that of the thickness of web 18 while the width of body 140 is substantially equal to the distance between the inside opposed surfaces on the lips 21 on each flange 19. The edges of the retaining sections 142 are cut away at 146 at slot 144 to clear the fillets 20 as will become more apparent. The section 141 has a locking edge 143 to engage the inside surface of lip 21.

The interlock 126 is installed similarly to interlock 26. During installation, the angle locking section 141 folds back over itself as the connector is forced between the lips 21 on stringer 15 and then expands into recess 25 behind lip 21 so that the edge 143 engages the inside edge 24 of lip 21 to lock the joint 13 together.

Because the joint 13 is formed simply by pushing the tongue 30 on connector 16 straight into the opening 25 on stringer 15, this construction lends itself to automated machine assembly. Also, while the angle between the working portion of locking sections 41 or 141 and the body 40 or 140 of interlocks 26 or 126 is shown as perpendicular, it is to be understood that this angle may be varied if the connector 16 is to be at an angle not perpendicular with respect to stringer 15.

While specific embodiments of the invention have been disclosed herein, it is to be understood that full use may be made of modifications, substitutions and equivalents without departing from the scope of the invention.

I claim:

1. A structural building panel including:

A plurality of beam elements interlocked together to form an open grid frame, all of said beam elements having the same general cross-sectional configuration including a central web, a pair of flanges along opposite edges of said central web, and a pair of inwardly turned lips along opposite edges of each of said flanges; said beam elements defining an inwardly opening locking recess between said central web, each said flange and each said lip; certain of said beam elements including a tongue formed on the end of said central web projecting beyond the ends of said flanges and lips of said certain beam elements; and, each of said tongues sized to be slidably received between opposed said lips on the same side of said central web of another of said beam elements and defining outwardly opening notches in opposite edges thereof; and, resilient interlocking means carried by opposite sides of each of said tongues attaching said certain beam elements to said another beam element, each of said resilient interlocking means comprising:

a resilient body defining a slot therein, said central web of said certain beam element received in said slot and said body adjacent said slot engaging said central web of said certain beam element to laterally locate said interlocking means with respect to said central web of said certain beam element;

a resilient locking tab on said body slidably received in said notch in said tongue of said certain beam element to locate said resilient interlocking means with respect to said tongue; and, resilient retaining means on said body adjacent said slot engaging said flange of said certain beam element to maintain said locking tab within said notch.

2. The building panel of claim 1 wherein said interlocking means includes a resilient arcuate locking section lying along the side of said tongue within said recess in said another beam element behind said lips to connect said certain beam element to said another beam element.

3. The panel of claim 2 further including a pair of skin elements attached to opposite sides of said frame.

4. The building panel of claim 1 wherein said interlocking means includes a resilient locking angle section lying along the side of said tongue within said recess in said another beam element and engaging the inside of said lips to connect said certain beam element to said another beam element.

5. The panel of claim 4 further including a pair of skin elements attached to opposite sides of said frame.

6. The panel of claim 1 further including a pair of skin elements attached to opposite sides of said frame.

* * * * *